United States Patent
Richards

Patent Number: 5,901,744
Date of Patent: May 11, 1999

[54] WATER SUPPLY SYSTEM FOR A WATER SOURCE WITH LIMITED FLOW CAPABILITY

[76] Inventor: Samuel K. Richards, 73 Fall Mountain Lake Rd., Terryville, Conn. 06786

[21] Appl. No.: 08/709,364

[22] Filed: Sep. 6, 1996

[51] Int. Cl.[6] .................................................. E03B 11/02
[52] U.S. Cl. ........................ 137/568; 137/202; 417/44.2
[58] Field of Search ..................... 137/568, 202; 417/44.2

[56] References Cited

U.S. PATENT DOCUMENTS

| | | | |
|---|---|---|---|
| 256,291 | 4/1882 | Coggin | 137/206 |
| 407,830 | 7/1889 | Loretz | 137/207 |
| 1,370,661 | 3/1921 | Maxwell | 137/206 |
| 1,472,931 | 11/1923 | Morison | 137/568 X |
| 1,482,376 | 2/1924 | Anderson | 137/568 |
| 2,172,057 | 9/1939 | Burks | 417/44.2 |
| 2,425,070 | 8/1947 | Nicolette | 137/202 |
| 3,045,607 | 4/1962 | Lindner | 103/221 |
| 3,394,733 | 7/1968 | Jacuzzi | 137/568 |
| 3,493,001 | 2/1970 | Bevandich | 417/44.2 |
| 3,515,172 | 6/1970 | Hahn, Jr. | 137/568 X |
| 4,072,168 | 2/1978 | Wittenmyer | 137/568 X |
| 4,104,004 | 8/1978 | Graef | 137/202 X |
| 4,304,526 | 12/1981 | Shetler, Sr. | 417/38 |
| 4,442,858 | 4/1984 | Everett | 137/568 X |
| 4,519,418 | 5/1985 | Fowler | 137/568 X |
| 5,281,101 | 1/1994 | Bevington | 417/44.2 X |

*Primary Examiner*—John Rivell
*Attorney, Agent, or Firm*—William C. Crutcher

[57] ABSTRACT

An auxiliary system for insuring adequate water supply during peak periods from a well with a low recovery rate. A gravity storage tank is replenished at a rate equal to or slightly lower than the recovery rate of the well. A float-controlled air shutoff valve prevents overfilling and allows water to drain from the storage tank to supply a pressure-responsive pump. The pump, together with a diaphragm pressure tank, supplies normal household use at varying flow rates, drawing its peak requirements from the gravity storage tank.

10 Claims, 2 Drawing Sheets

WATER SUPPLY SYSTEM FOR A WATER SOURCE WITH LIMITED FLOW CAPABILITY

BACKGROUND OF THE INVENTION

This invention relates to a water supply system and more particularly to a system for supplying a user with an adequate water supply during peak demand periods from a water source with limited flow capability, such as a well with a low recovery rate.

Residential water supply systems are known which are supplied from wells having a low recovery rate. While the normal flow rate of the well may be adequate on the average for supplying the household, the actual usage of the household varies from periods of no water usage at all to peak demand periods when water is drawn at a rapid rate for washing machines, showers, water closets, etc. At such times, the necessary extra water flow is drawn both from water in the well stand pipe, as well as a water pressure tank. This water is replenished during periods of low usage. However if usage continues at high rates exceeding the recovery rate of the well, the well will run dry and the pump may continue to run when there is no water in the well, which may damage the pump.

One solution to providing an adequate supply of water is to redrill the well or drill a new well in an effort to improve the recovery rate. This is expensive and damages the property due to heavy equipment activity, resulting debris and expensive landscape repair.

Systems are known in the prior art for controlling well pump discharge to produce a flow equal to the yield of the well. Such a system is shown in U.S. Pat. No. 4,304,526 issued Dec. 8, 1981 to Shetler. This system employs a diaphragm-type water storage tank connected in parallel with a low yield control tank (FIGS. 8 and 9 of the patent) connected to the household supply lines. In this system, the household supply pressure is necessarily determined by a mode of operation which is primarily designed to protect the pump.

It would be desirable to provide a system for accumulating and storing water at the recovery rate of the well, which could be drawn upon during peak periods without depleting the water in the well casing.

It would also be desirable to furnish an adequate supply of water to the user's household at variable rates of flow, including peak flow periods from a well whose recovery rate is adequate on the average, but inadequate during peak demand periods.

DRAWINGS

The invention, both as to organization and method of practice, together with further objects and advantages thereof, will best be understood by reference to the following specification, taken in connection with the accompanying drawings, in which:

FIG. 1 is a simplified schematic diagram of a residential water system supplied by a well, illustrating the improved water supply system, and FIG. 2 is an enlarged diagrammatic view of the system according to the present invention which is added to the normal household water supply system.

SUMMARY OF THE INVENTION

Briefly stated, the invention provides a system for supplying water from a pressurized water source which replenishes a gravity feed storage tank at a normal recovery rate, such as from a low yield well, and furnishing the water from the storage tank to the household user's water supply line at varying rates of use, including a peak rate of flow which exceeds the normal recovery rate of the well. The system in its simplest form comprises a water intake control valve having an inlet connected to the pressurized water source and adapted to discharge water at a flow rate which is slightly less than that of the water source normal recovery rate, a storage tank having an inlet connected to receive water from the water intake control valve and having an outlet arranged to discharge water by gravity flow from the storage tank, an air flow shutoff valve responsive to water level in the storage tank and arranged to shut off the ingress and egress of air in the upper part of the storage tank when the stored water reaches a selected level, and a pressure responsive pump having an inlet connected to receive water from the outlet of the storage tank and having an outlet communicating with the user's supply line, the pressure responsive pump being adapted to pump water from the storage tank when the user line pressure drops below a preselected minimum value and to shut off when the user's supply line pressure rises above a preselected maximum value.

In its preferred embodiment, the system includes a diaphragm pressure tank connected between the user's supply line and the outlet of the pressure responsive pump which reduces pressure variations and augments the water supply during periods of peak flow.

DESCRIPTION OF THE PREFERRED EMBODIMENT

Figure 1:
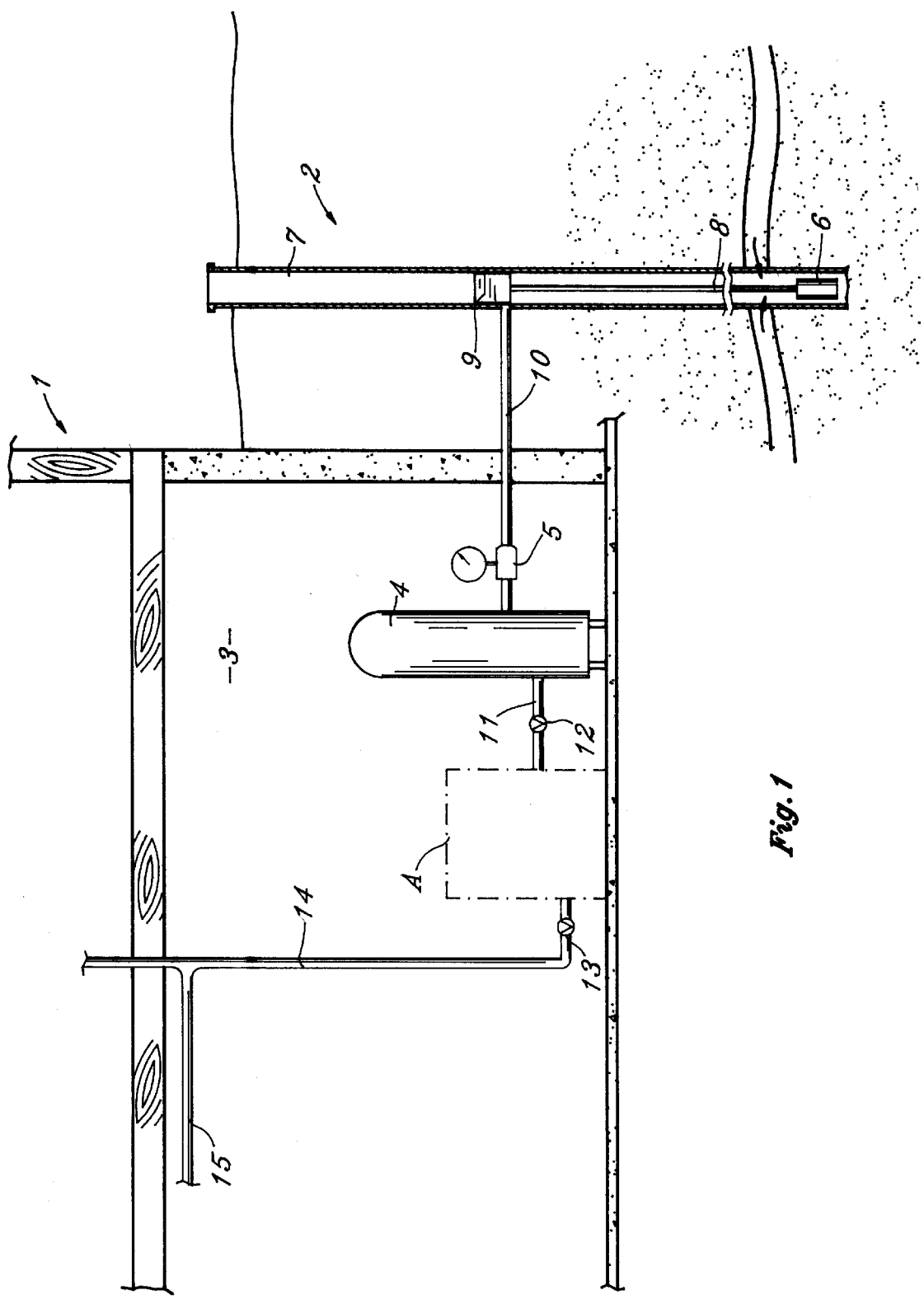

Referring now to FIG. 1 of the drawing, a diagrammatic cross section is shown through a portion of a user's residence, shown generally at 1, supplied with water from a well shown generally at 2. The normal household water supply system located in basement space 3 comprises a water storage tank 4, usually incorporating a flexible diaphragm, a water pump pressure control switch 5 connected by wiring (not shown) to a power source (not shown) and to a pump 6 at the bottom of a well casing 7. Pump 6 is connected by a vertical water line 8 to a check valve assembly 9 and from there through an underground supply line 10 to water tank 4. The system operates in a conventional manner, whereby when the water pressure in line 10 drops below a lower preselected value, switch 5 turns on the pump until the pressure is restored to an upper preselected value, whereupon the pump shuts off.

Although the system shown is for a submersible pump, the explanation is equally applicable to another well-known type of system having a deep well jet pump located in basement 3 operating a jet located at the bottom of the well.

Water is supplied from tank 4 through a line 11 with shutoff valve 12 to an auxiliary water supply system shown generally at "A" by the dot-dash enclosure which is the subject of the present invention. System A is connected through a shutoff valve 13 to the household user's supply line 14. Supply line 14 is connected to various branch lines, such as 15, servicing showers, sinks, water closets, etc. The demand rate for water supply to the household varies from periods when there is no usage at all, to periods of peak demand where washing machines, showers, dishwashers, etc. are all demanding a high flow rate of water. Assuming that the well pump 6 has the pumping capability and also has an adequate water supply in the well casing 7, tank 4 will receive an adequate supply to meet the peak demand.

The water in casing 7 is supplied at a "recovery rate" from seepage through crevices between rock strata as indicated by the arrows. The recovery rate can be more or less determined with some degree of reliability. One method of determining well recovery rate is to employ a well water level meter, commercially available as Model N-01487-00 manufactured by Cole-Parmer Co. The recovery rate may be adequate for the total water requirements of the household if the water is drawn at a constant average rate, but inadequate for meeting peak demand for water.

Figure 2:
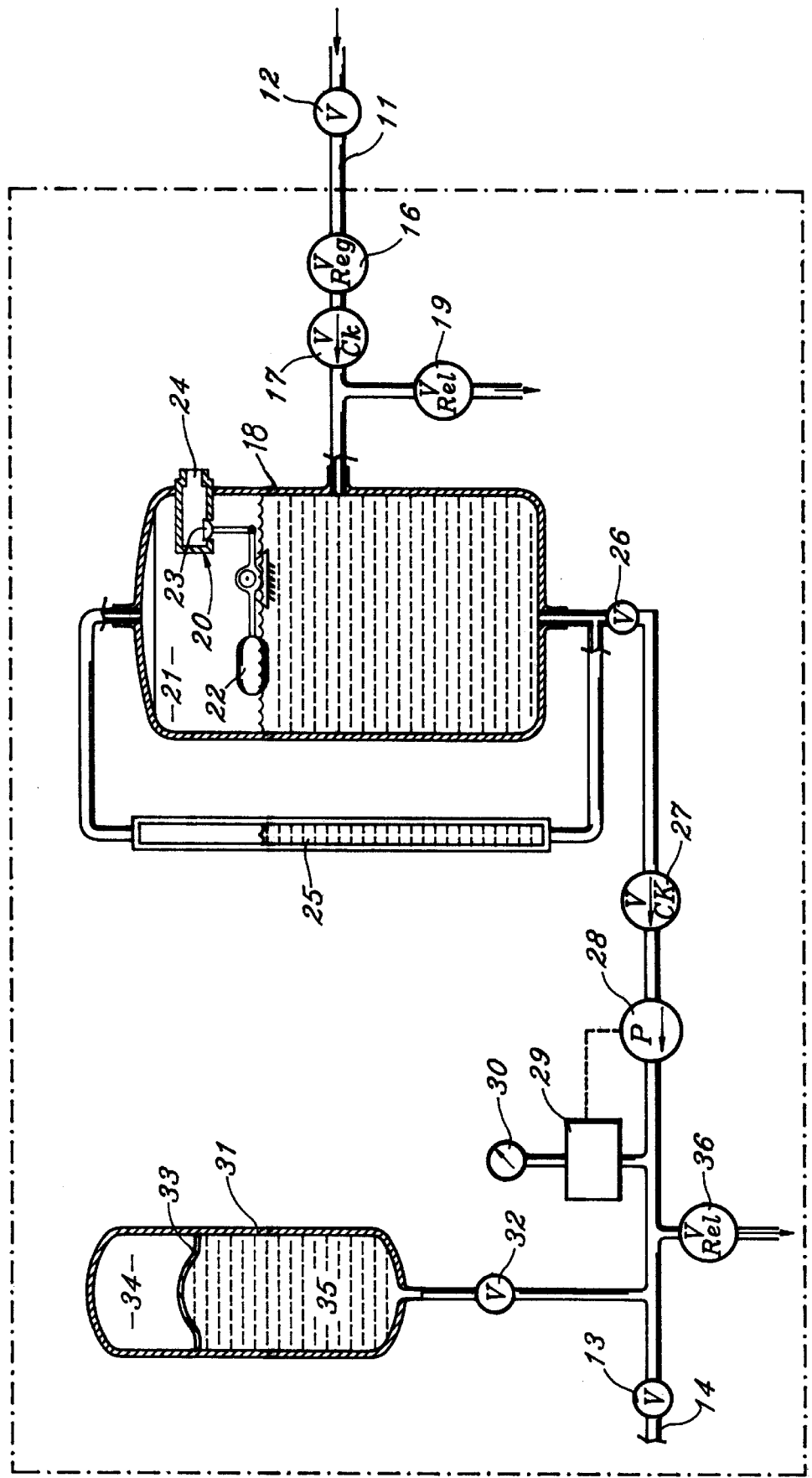

The auxiliary system A may be seen by reference to FIG. 2. System A is connected between the outlet line 11 leading from water tank 4 (a pressurized water source) and the user's supply line 14. In order to feed the auxiliary system A at a flow rate which is slightly less than the well recovery rate, the system employs a water intake control valve 16. The water intake control valve 16, may either be automatically controlled or may be manually adjusted to allow a flow rate which is slightly less than the well recovery rate. I have found that a very simple and effective valve 16 is a manually adjustable needle valve of the type which permits manual adjustment of a variable thickness needle into an orifice through which the water flows. This may be adjusted by trial and error to obtain the desired flow rate as measured by a Cole-Parmer flow meter, Model N-03228-02. While the adjustability of valve 16 is desirable, it is within the scope of the present invention to employ a fixed orifice to restrict the rate of flow, or a series of fixed orifices with a set of valves to select one or more fixed orifices. It is also possible to employ an automatically controlled valve which maintains a selected flow rate. One such automatically controlled valve is available as the Cole-Parmer "Totalizer", Model N-05627-30, which is a variable area flow meter with built-in control valve and other control features. Such conventional flow controls are known to those skilled in the art as alternative arrangements for the water intake control valve 16. Since there is expected to be some slight variation in the normal recovery rate of the well, depending upon the season and water table, the valve 16 is preferably adjusted to provide flow which is slightly less than, but no greater than the normal recovery rate.

The outlet of water intake control valve 16 is connected via a check valve 17 to a main storage tank 18. A pressure relief valve 19 is connected between check valve 17 and storage tank 18 to discharge water if the pressure in tank 18 exceeds a preselected value. However storage tank 18 is designed as a gravity feed tank so that it normally operates in an unpressurized mode. An air flow shut off valve, shown generally at 20 is responsive to the water level in the storage tank and arranged to shut off the ingress and egress of air in an upper part 21 of the storage tank when the stored water reaches a selected level, as shown in the drawing. Many equivalent systems are suitable, but the one depicted schematically in the drawing employs a float 22 which lowers a valve element 23 to close the valve 20 when the water rises to a selected level. When the water falls below the level, the element 23 rises and air can flow freely to and from the upper part 21 of the tank through an opening 24. A sight glass 25 is provided to visually determine the water level in storage tank 18 in a manner which will be apparent from the drawing.

The outlet of storage tank 18 is connected through a shut off valve 26 and a check valve 27 to the inlet of a pressure responsive pump 28. Pump 28 is controlled by a pressure-responsive switch 29 with the pressure indicated by a gauge 30. Switch 29 operates in a conventional manner by turning on pump 28 when the outlet pressure drops below a preselected minimum value and shuts off when the outlet pressure rises above a preselected maximum value. The outlet of pump 28 communicates with the user's supply line 14 via a shut off valve 13. Therefore, the pressure responsive pump 28, with switch 29, determines the water pressure available in the user supply line 14 instead of the normal well pump pressure switch 5.

Connected between the user supply line 14 and the outlet of pressure-responsive pump 28 is a diaphragm pressure tank 31 with a shut off valve 32. An internal flexible diaphragm 33 operates in a conventional manner, so that when valve 32 is open, tank 31 fills until the air pressure in an upper chamber 34 balances the water pressure in a lower chamber 35. A pressure responsive relief valve 36 is provided to discharge water when the pressure exceeds a preselected value.

OPERATION

The operation of the system shown in FIGS. 1 and 2 is as follows. Water is supplied at a steady rate which corresponds to the recovery rate of the well 2 to storage tank 18. Storage tank 18 serves as a source of water supply to the inlet of pump 28 which, in conjunction with the diaphragm pressure tank 31 supplies the needs of the household. Therefore, the pressure-responsive pump 28 and pressure diaphragm tank 31 are substituted for the normal household supply tank 4 and well pump 6. However, rather than being supplied with a source of water which is inadequate for peak demand, as in the case of a low yield well, the system is supplied from an adequate water source, i.e., storage tank 18, which is slowly but steadily replenished. When tank 18 is full the air flow shut off valve limits further entry of water. When the water is being drawn out of storage tank 18 by gravity flow, the air shutoff valve is open permitting air to flow into the tank so as not to impede the discharge of water.

For example, a well six inches in diameter and 300 feet deep can hold 440 gallons of water. If the recovery rate of the well is such that it can deliver as little as two quarts of water per minute, then the well is capable of delivering 720 gallons of water every 24-hours. Since the well itself can only store 440 gallons of water, 280 gallons of water is lost to the household every 24-hours without the system of this invention. The auxiliary system will collect and store the additional 280 gallons of water that would ordinarily have been lost to the household. Also, in case of an electrical power failure, there will be a full tank of stored water in the main water storage tank ready for use.

Because the auxiliary system A is arranged so that it can simply be inserted between the existing well pump system and the user supply line, it may be manufactured as a package system complete with the necessary tanks and valves. Then it is easily inserted as a single unit, when it becomes apparent that the well recovery rate is limited and that the household requires a more abundant water supply.

While there has been disclosed what is considered to be the preferred embodiment of the invention, other modifications will occur to those skilled in the art, and it is desired to secure in the appended claims all such modifications as fall within the true spirit and scope of the invention.

I claim:

1. A system for periodically supplying water from a pressurized water source, which is replenished at a normal recovery rate, to a user supply line at a peak rate of flow which exceeds the normal recovery rate at which the water source is being replenished, said system comprising:

a water intake control valve having an inlet connected to said water source and adapted to discharge water at a flow rate which is slightly less than that of the water source normal recovery rate, a storage tank having an inlet connected to receive water from the water intake control valve and having an outlet arranged to discharge water by gravity flow from the storage tank, an air flow shutoff valve responsive to water level in the storage tank and arranged to shut off the ingress and egress of air in the upper part of the storage tank when the stored water reaches a selected level, and a pressure responsive pump having an inlet connected to receive water from the outlet of the storage tank and having an outlet communicating with the user supply line, said pressure responsive pump being adapted to pump water from the storage tank when the user line pressure drops below a preselected minimum value and to shut off when the user's supply line pressure rises above a preselected maximum value.

2. The system according to claim 1 and further including a diaphragm pressure tank connected between the user supply line and the outlet of the pressure responsive pump and adapted to reduce pressure variations and to augment the water supply during periods of peak flow.

3. The system according to claim 1, wherein the air flow shutoff valve comprises a float-operated valve disposed in the upper part of the storage tank.

4. The system according to claim 1, wherein a check valve is disposed between the water intake control valve and the storage tank.

5. The system according to claim 1, wherein the storage tank includes an external sight gauge connected between the upper end and the lower end of the storage tank in order to visually determine the water level.

6. The system according to claim 1, wherein a check valve is disposed between the outlet of the storage tank and the pressure-responsive pump.

7. The system according to claim 1, wherein the water intake control valve is adapted to discharge water at a flow rate which is slightly less than but which does not exceed the water source normal recovery rate.

8. The system according to claim 1, wherein the water intake control valve comprises a manually adjustable needle valve.

9. The system according to claim 1, wherein the water intake control valve includes at least one fixed orifice.

10. A system for periodically supplying water from a pressurized water source, which is replenished from a low yield well at a normal recovery rate to a user supply line at a peak rate of flow which exceeds the normal recovery rate of the well, said system comprising:

a water intake control valve having an inlet connected to said water source and adapted to discharge water at a flow rate which is slightly less than that of the well recovery rate, a storage tank having an inlet connected to receive water from the water intake control valve and having an outlet arranged to discharge water by gravity flow from the storage tank, an air flow shut off valve having a float responsive to water level in the storage tank and arranged to shut off the ingress and egress of air in the upper part of the storage tank when the stored water reaches a selected level, a pressure-responsive pump having an inlet connected to receive water from the outlet of the storage tank and having an outlet communicating with the user's supply line, said pressure-responsive pump being adapted to pump water from the storage tank when the user's line pressure drops below a preselected minimum value and to shut off when the user's supply line pressure rises above a preselected maximum value, and a diaphragm pressure tank connected between the user supply line and the outlet of the pressure-responsive pump and adapted to reduce pressure variations and to augment the water supply during periods of peak flow.

* * * * *